(12) United States Patent
Mourré et al.

(10) Patent No.: US 12,612,030 B2
(45) Date of Patent: Apr. 28, 2026

(54) HYBRID VEHICLE ENERGY STORAGE CONTROL

(71) Applicant: JAGUAR LAND ROVER LIMITED, Whitley (GB)

(72) Inventors: Thomas Mourré, Whitley (GB); Laurentiu Cancel, Whitley (GB); Matthew Hancock, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 54 days.

(21) Appl. No.: 18/703,102

(22) PCT Filed: Oct. 20, 2021

(86) PCT No.: PCT/EP2021/079037
§ 371 (c)(1),
(2) Date: Apr. 19, 2024

(87) PCT Pub. No.: WO2023/066474
PCT Pub. Date: Apr. 27, 2023

(65) Prior Publication Data
US 2024/0425031 A1 Dec. 26, 2024

(51) Int. Cl.
*B60W 20/12* (2016.01)
*G01C 21/34* (2006.01)

(52) U.S. Cl.
CPC ............. *B60W 20/12* (2016.01); *G01C 21/34* (2013.01); *B60W 2710/24* (2013.01)

(58) Field of Classification Search
CPC .... B60W 20/12; B60W 2710/24; G01C 21/34

USPC ............................................................. 701/22
See application file for complete search history.

(56) References Cited

U.S. PATENT DOCUMENTS

| | | | |
|---|---|---|---|
| 2007/0010942 A1* | 1/2007 | Bill .................... | G01C 21/3617 701/424 |
| 2014/0218218 A1* | 8/2014 | Lloreda ................ | G08G 1/207 340/989 |
| 2017/0072937 A1 | 3/2017 | Kapadia et al. | |
| 2020/0298825 A1* | 9/2020 | Kurihashi ............. | B60W 20/12 |
| 2021/0101582 A1 | 4/2021 | Lee | |

OTHER PUBLICATIONS

ISA European Patent Office, International Search Report and Written Opinion Issued in Application No. PCT/EP2021/079037, Jun. 15, 2022, WIPO, 10 pages.

* cited by examiner

*Primary Examiner* — Isaac G Smith
(74) *Attorney, Agent, or Firm* — McCoy Russell LLP

(57) ABSTRACT

A control system for a hybrid-electric vehicle, the control system comprising one or more controllers, wherein the control system is configured to: determine a predicted destination for the vehicle; determine an associated confidence value in dependence on the predicted destination; determine a route to be travelled by the vehicle in dependence on the predicted destination; and output a signal to control an energy storage means of the vehicle in dependence on the determined route and associated confidence value, such that the vehicle may travel a portion of the determined route in an electric-only mode.

13 Claims, 4 Drawing Sheets

HYBRID VEHICLE ENERGY STORAGE CONTROL

CROSS REFERENCE TO RELATED APPLICATIONS

The present application is a U.S. National Phase of International Application No. PCT/EP2021/079037 entitled "HYBRID VEHICLE ENERGY STORAGE CONTROL," and filed on Oct. 20, 2021. The entire contents of each of the above-listed applications are hereby incorporated by reference for all purposes.

TECHNICAL FIELD

The present disclosure relates to hybrid vehicle energy electric storage control. In particular, but not exclusively, it relates to control of energy storage in one or more batteries of a hybrid electric vehicle. Aspects of the invention relate to a control system, a method, a vehicle and a computer readable storage medium having stored thereon computer-readable instructions which are arranged to implement the method.

BACKGROUND

The hybrid electric vehicle, such as a plug-in hybrid electric vehicle, is capable of driving in electric-only mode, depending on, for example, the state of charge of an energy storage means of the vehicle, such as high voltage battery or batteries. However, control of energy storage in such energy storage means of a vehicle may not be done efficiently or effectively.

SUMMARY OF THE INVENTION

It is an aim of the present invention to address one or more of the disadvantages associated with the prior art.

According to an aspect of the invention, there is provided a control system for a hybrid-electric vehicle, the control system comprising one or more controllers, wherein the control system is configured to:

determine a predicted destination for the vehicle;

determine an associated confidence value in dependence on the predicted destination;

determine a route to be travelled by the vehicle in dependence on the predicted destination; and output a signal to control an energy storage means of the vehicle in dependence on the determined route and associated confidence value, such that the vehicle may travel a portion of the determined route in an electric-only mode.

An advantage is efficient, effective and automatic control of an energy storage means of a vehicle, such as one or more traction batteries. Another advantage is enhanced automated control of one or more systems of a vehicle.

In some examples, the associated confidence value is determined in dependence on at least one of: time of day, day of week, week of month, month of year, a present location of the vehicle, number of times the vehicle has stopped at a present location of the vehicle, number of times the vehicle has travelled to a possible destination, number of times the vehicle has travelled from a present location of the vehicle to a possible destination, and one or more occupants of the vehicle.

In some examples, outputting a signal to control the energy storage means of the vehicle in dependence on the determined route and associated confidence value comprises determining if the associated confidence value is greater than a limit and determining if the ratio between a distance the vehicle has travelled along the route and a distance to the predicted destination is greater than a limit. An advantage is prevention of incorrect and/or inefficient control of an energy storage means of a vehicle, such as one or more traction batteries.

In examples, the control system is configured to redetermine the predicted destination and the associated confidence value while the vehicle is travelling.

In examples, controlling the energy storage means comprises selecting an energy management mode for at least a portion of the route. In examples, the energy management mode is a charging mode or a harvesting mode.

In examples, controlling the energy storage means comprises controlling at least one of:

an electrical energy usage of the vehicle;

an electrical energy storage of the vehicle; and an electrical energy generation of the vehicle.

In examples, controlling the energy storage means comprises controlling the energy storage means to allow the vehicle to travel at least one predetermined portion of the route in an electric-only mode. An advantage is effective and efficient use and/or management of electrical energy of a vehicle According to a further aspect of the invention there is provided a vehicle comprising a control system as described herein and at least one energy storage means.

According to a further aspect of the invention there is provided a method for a hybrid-electric vehicle, comprising:

determining a predicted destination for the vehicle;

determining an associated confidence value in dependence on the predicted destination;

determining a route to be travelled by the vehicle in dependence on the predicted destination; and outputting a signal to control an energy storage means of the vehicle in dependence on the determined route and associated confidence value, such that the vehicle may travel a portion of the determined route in an electric-only mode.

In examples, the associated confidence value is determined in dependence on at least one of: time of day, day of week, week of month, month of year, a present location of the vehicle, number of times the vehicle has stopped at a present location of the vehicle, number of times the vehicle has travelled to a possible destination, number of times the vehicle has travelled from a present location of the vehicle to a possible destination, and one or more occupants of the vehicle.

In examples, outputting a signal to control the energy storage means of the vehicle in dependence on the determined route and associated confidence value comprises determining if the associated confidence value is greater than a limit and determining if the ratio between a distance the vehicle has travelled along the route and a distance to the predicted destination is greater than a limit.

In examples, the method comprises redetermining the predicted destination and the associated confidence value while the vehicle is travelling.

In examples, controlling the energy storage means comprises selecting an energy management mode for at least a portion of the route.

According to a further aspect of the invention, there is provided computer software that, when executed, is arranged to perform at least a part of any one or more of the methods described herein.

Aspects and embodiments of the invention provide a control system for a vehicle, a vehicle, a method for a hybrid electric vehicle, and computer software as claimed in the appended claims.

According to a further aspect of the invention there is provided computer software that, when executed, is arranged to perform any one or more of the methods described herein.

According to a further aspect of the invention there is provided a non-transitory computer readable medium comprising computer readable instructions that, when executed by a processor, cause performance of any one or more of the methods described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
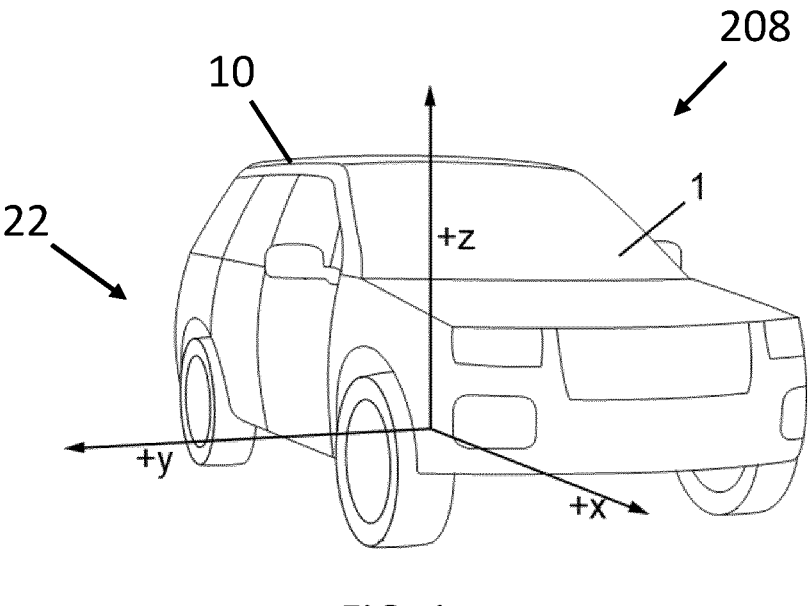
FIG. 1 illustrates an example of a vehicle.

FIG. 1 illustrates an example of a vehicle 10 in which embodiments of the invention can be implemented. In some, but not necessarily all examples, the vehicle is a passenger vehicle, also referred to as a passenger car or as an automobile. In other examples, embodiments of the invention can be implemented for other applications, such as commercial vehicles. FIG. 1 is a front perspective view and illustrates a longitudinal x-axis between the front and rear of the vehicle representing a centreline, an orthogonal lateral y-axis between left and right lateral sides of the vehicle, and a vertical z-axis. A forward/fore direction typically faced by a driver's seat is in the positive x-direction; rearward/aft is −x. A rightward direction as seen from the driver's seat is in the positive y-direction; leftward is −y. These are a first lateral direction and a second lateral direction.

The vehicle 10 is a hybrid electric vehicle (HEV) such as a plug-in hybrid electric vehicle (PHEV). The vehicle 10 has at least one electric only mode of propulsion among other modes of propulsion. The vehicle 10 comprises a plurality of systems including a control system 208, and energy storage means 22, such as one or more batteries, for example one or more high voltage batteries. Consequently, FIG. 1 illustrates a vehicle 10 comprising a control system 208 as described herein and at least one energy storage means 22.

Figures 2A, 2B:
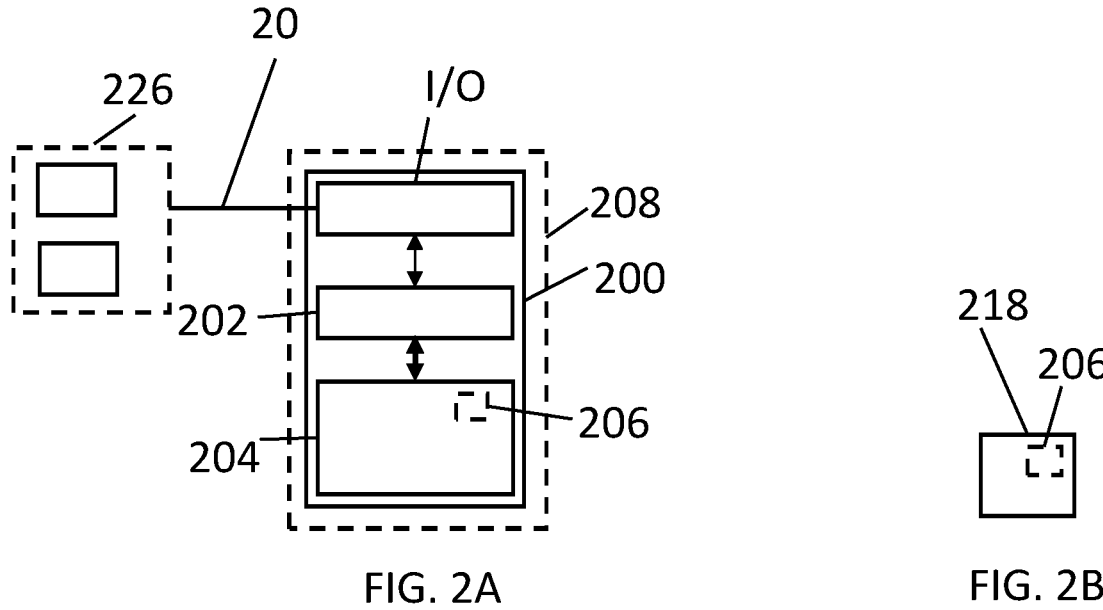
FIGS. 2A, 2B illustrate an example of a control system and of a non-transitory computer readable storage medium.

The control system 208 is configured to implement any one or more of the methods described herein. FIG. 2A illustrates how the control system 208 may be implemented. The control system 208 of FIG. 2A illustrates a controller 200. In other examples, the control system 208 may comprise a plurality of controllers 200 onboard and/or off board the vehicle 10. In examples any suitable control system 208 can be used.

The controller 200 of FIG. 2A includes at least one processor 202; and at least one memory device 204 electrically coupled to the electronic processor 202 and having instructions 206 (for example a computer program) stored therein, the at least one memory device 204 and the instructions 206 configured to, with the at least one processor 202, cause any one or more of the methods described herein to be performed.

FIG. 2A therefore illustrates a control system 208, wherein the one or more electronic controllers 200 collectively comprise: at least one electronic processor 202 having an electrical input for receiving information associated with energy storage control; and at least one electronic memory device 204 electrically coupled to the at least one electronic processor 202 and having instructions 206 stored therein; and wherein the at least one electronic processor 202 is configured to access the at least one memory device 204 and execute the instructions thereon so as to cause the control system 208 to perform and/or cause performance of any one or more of the methods described herein.

Also illustrated in the example of FIG. 2A are one or more vehicle systems 226. In examples, the vehicle system(s) 226 can comprise any suitable vehicle system(s). For example, the vehicle system(s) 226 can comprise any suitable vehicle system(s) 226 from which the control system 208 can receive and/or to which the control system 208 can transmit, directly or indirectly, one or more signals 20, for example to control an energy storage means 22 of a vehicle 10. In examples, the one or more vehicle systems 226 comprise one or more systems involved in control of an energy storage means of the vehicle 10. In examples, the one or more vehicle systems 226 comprise one or more systems involved in control of state of charge of an energy storage means 22 of the vehicle 10. For example, one or more vehicle systems 226 can comprise any suitable system or systems 226 of the vehicle configured to provide energy to and/or draw energy from energy storage means 22 of the vehicle 10. For example, the one or more vehicle systems 226 can comprise one or more energy recovery systems and/or one or more electric motors and so on. In examples, the one or more vehicle systems 226 can comprise one or more systems configured to report on the present state and/or present usage of energy by the energy storage means 22 of the vehicle 10. In examples, the one or more vehicle systems 226 can comprise one or more systems configured to provide information to allow a determination of a predicted destination 12 for the vehicle 10 and/or an associated confidence value. In examples, the one or more systems 226 comprise a powertrain controller module and/or an infotainment system.

FIG. 2B illustrates a non-transitory computer readable storage medium 218 comprising the instructions 206 (computer software). Accordingly, FIG. 2B illustrates a non-transitory computer readable medium 218 comprising computer readable instructions 206 that, when executed by a processor 202, cause performance of at least the method of one or more of FIG. 3 and/or as described herein.

Figure 3:
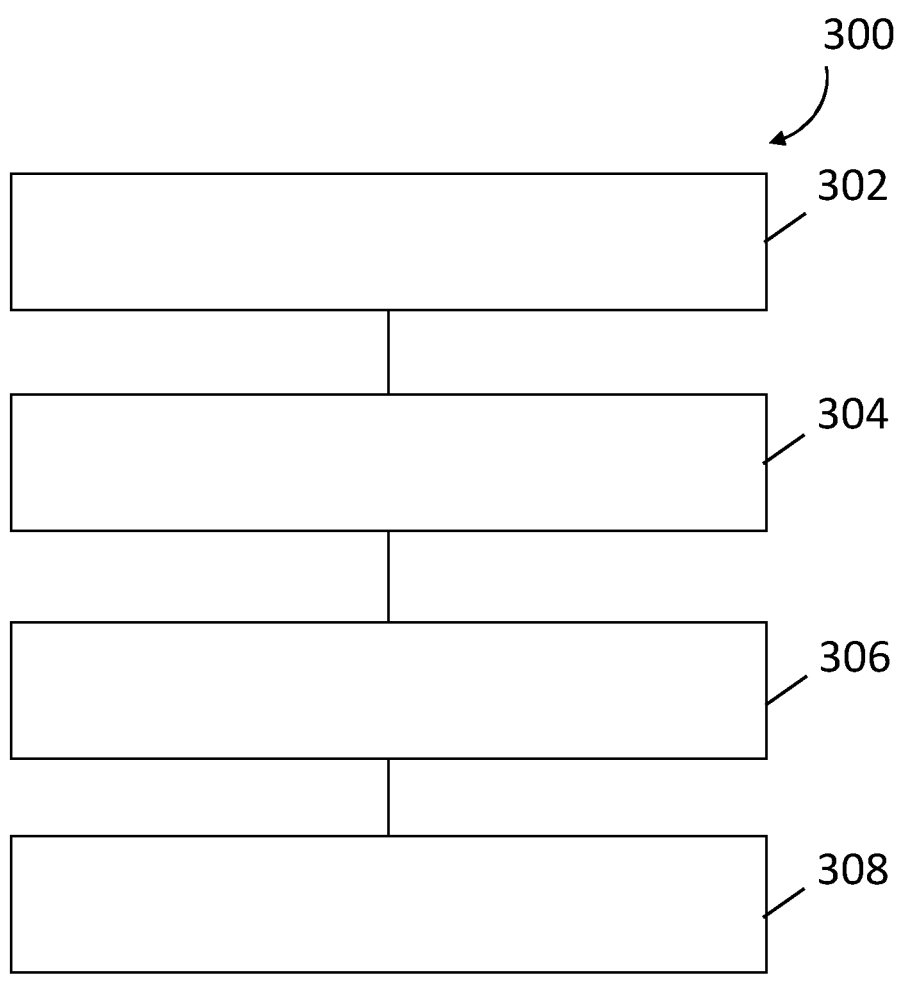
FIG. 3 illustrates an example of a method.

FIG. 3 illustrates an example of a method 300. The method 300 can be considered a method 300 of controlling an energy storage means 22 of a hybrid electric vehicle 10.

In some examples, the method 300 can be considered a method 300 of controlling activation of hybrid electric vehicle energy storage means control. In examples, the method 300 is performed by the control system 208 of FIGS. 2A, 2B. That is, in examples, the control system 208 described herein comprises and/or provides means for performing the method 300. However, any suitable means may be used to perform the method 300. In examples, the method 300 can be considered a computer implemented method 300 for a vehicle 10, such as a hybrid electric vehicle 10. One or more of the features discussed in relation to FIG. 3 can be found in one or more of the other figures.

At block 302 the method 300 comprises determining a predicted destination 12 for the vehicle 10. As used herein, the term "determining" (and grammatical variants thereof) can include, not least; calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also "determining" can include resolving, selecting, choosing, establishing, and the like.

Accordingly, in examples, block 302 can comprise receiving a predicted destination 12 for the vehicle 12. In examples, determining a predicted destination 12 for the vehicle 10 can be performed in any suitable way using any suitable method. In examples, the predicted destination 12 for the vehicle 10 can be determined in dependence on any suitable information/data determined in any suitable way. In examples, the information/data can be determined from any suitable source(s), for example information can be received from one or more vehicle systems 226 and/or received from one or more sources external to the vehicle and/or received from one or more user devices and/or retrieved from memory 204 and so on.

In examples, the predicted destination 12 is determined in dependence on at least one of: time of day, day of week, week of month, month of year, a present location 24 of the vehicle 10, number of times the vehicle 10 has stopped at a present location 24 of the vehicle 10, number of time the vehicle 10 has travelled to a possible destination 26, number of times the vehicle 10 has travelled from a present location 24 of the vehicle 10 to a possible destination 26, and one or more occupants of the vehicle 10.

For example, it can be determined that in the past the vehicle 10 has travelled from a present location 24 of the vehicle 10 to a particular destination at the present time of day of the present day of the week a number of times, allowing a predicted destination 12 for the vehicle 10 to be determined.

For example, it can be determined that when a particular combination of occupants are present in the vehicle 10 when the vehicle 10 is at a present location 24 the vehicle 10 has, in the past, travelled to a particular destination. In examples, the occupants of the vehicle 10 can be identified in any suitable way. For example, in dependence on image recognition via one or more camera signals, and/or using communication with one or more personal devices of occupants of the vehicle and so on. In examples, one or more machine learning systems and/or programmes and/or algorithms can be used in determining the predicted destination 12 for the vehicle 10.

For example, any suitable information/data can be used as input(s) for one or more machine learning systems and/or programmes and/or algorithms. In examples, one or more of the above mentioned factors (time of day, day of week, week of month and so on) can be used as input(s) for one or more machine learning systems and/or programmes and/or algorithms. Accordingly, in examples, the processing of the information/data may involve artificial intelligence or machine learning algorithms. The information/data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

In some examples, one or more destinations can be associated with a user or users of a vehicle 10. For example, a user can indicate destinations such as 'home' or 'work' and such indicated/labelled/predetermined destinations can influence the determination of a predicted destination 12 and/or an associated confidence value.

At block 304 the method 300 comprises determining an associated confidence value in dependence on the predicted destination 12. In examples, a confidence value can be considered associated with a predicted destination 22 because the confidence value indicates and/or represents a chance and/or likelihood and/or probability that the vehicle 10 will travel and/or be driven to the predicted destination 12. In examples, the associated confidence value can be determined with the predicted destination 12. Accordingly, in examples, method 300 comprises determining a predicted destination 12 for the vehicle 10 and an associated confidence value. In examples, determining an associated confidence value in dependence on the predicted destination 12 can be performed in any suitable way using any suitable method. In examples, the associated confidence value can be determined in dependence on the predicted destination 12 and any suitable information/data determined in any suitable way.

In examples, the information/data can be determined from any suitable source(s), for example information can be received from one or more vehicle systems 226 and/or received from one or more sources external to the vehicle and/or received from one or more user devices and/or retrieved from memory 204 and so on. In examples, the associated confidence value is determined in dependence on at least one of: time of day, day of week, week of month, month of year, a present location 24 of the vehicle 10, number of times the vehicle 10 has stopped at a present location 24 of the vehicle 10, number of time the vehicle 10 has travelled to a possible destination 26, number of times the vehicle 10 has travelled from a present location 24 of the vehicle 10 to a possible destination 26, and one or more occupants of the vehicle 10. For example, it can be determined that a vehicle 10 has travelled from a present location 24 to a first possible destination 26a five times, to a second possible destination 26b ten times, and to a third possible destination 26c three times. In such examples, the associated confidence value for the possible destinations 26a, b, c, can be determined in dependence on the relative number of times that the vehicle 10 has travelled from a present location 24 to the possible destinations 26a, b, c.

Additionally, or alternatively, other factors, such as those listed above, for example time of day, week of month and so on, can be used to determine the confidence value associated with a predicted destination 12. In examples, a confidence value can be determined for a plurality of possible destinations 26 that the vehicle 10 might travel to from its present location 24. In some examples, a possible destination 26 having the highest associated confidence value can be determined as the predicted destination 12. In examples, one or more machine learning systems and/or programmes and/or algorithms can be used in determining the associated confidence value. For example, any suitable information/data can be used as input(s) for one or more machine learning systems and/or programmes and/or algorithms. In examples, one or more of the above mentioned factors (time of day, day of week, week of month and so on) can be used as input(s) for one or more machine learning systems and/or programmes and/or algorithms.

Accordingly, in examples, the processing of the information/data, whether local or remote, may involve artificial intelligence or machine learning algorithms. The information/data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network. In some examples, one or more destinations can be associated with a user or users of a vehicle 10. For example, a user can indicate destinations such as 'home' or 'work' and such indicated/labelled/predetermined destinations can influence the determination of a predicted destination 12 and/or an associated confidence value. In examples, the associated confidence value can be expressed in any suitable way. In some examples, the associated confidence value can be expressed as a percentage with, for example, 100% representing certainty regarding a predicted destination 12 being correct.

In examples, a confidence value can be determined for a number of possible destinations 26 and possible destinations having associated confidence values below a limit can be discarded. In examples any suitable limit can be used, for example a limit in the range 35% to 45%, for example a limit of 40%. Accordingly, in examples, destinations having associated confidence values below a limit are not considered as possible destinations 26.

At block 306 the method 300 comprises determining a route 16 to be travelled by the vehicle 10 in dependence on the predicted destination 12. In examples, determining a route 16 to be travelled by the vehicle 10 in dependence on the predicted destination 26 can be performed in any suitable way using any suitable method. For example, any suitable route determining algorithm can be used to determine a route 16 to be travelled by the vehicle 10 in dependence on the predicted destination 12. As used herein, determining a route 16 is intended to include, in some examples, processing information/data such as the present location 24 of the vehicle 10, the predicted destination 12 and map information to determine the route 16 and also to include receiving the route 16 to be travelled by the vehicle 10. In examples, determining a route 16 can be considered determining a route 16 to allow the vehicle 10 to travel and/or traverse from the present location 24 of the vehicle 10 to a predicted destination 12.

At block 308 the method 300 comprises outputting a signal 20 to control an energy storage means 22 of the vehicle 10 in dependence on the determined route 16 and associated confidence value, such that the vehicle 10 may travel a portion 18 of the determined route 16 in an electric only mode.

Consequently, FIG. 3 illustrates a method 300 for a hybrid electric vehicle 10, comprising:

determining a predicted destination 12 for the vehicle 10;
determining an associated confidence value in dependence on the predicted destination 12; determining a route 16 to be travelled by the vehicle 10 in dependence on the predicted destination 12; and outputting a signal 20 to control an energy storage means 22 of the vehicle 10 in dependence on the determined route 16 and associated confidence value, such that the vehicle 10 may travel a portion 188 of the determined route 16 in an electrical only mode.

In examples, outputting a signal 20 to control an energy storage means of the vehicle 10 can be performed in any suitable way using any suitable method. For example, a signal 20 can be output to any suitable vehicle system or systems 226. In examples, outputting a signal 20 is performed to control the energy storage means 22 of the vehicle 10, in dependence on the determined route 16 and associated confidence value, in any suitable way using any suitable method, such that the vehicle 10 may travel a portion 18 of the determined route 16 in an electric only mode. Accordingly, in examples, the energy storage means 22 of the vehicle 10 can be controlled in any suitable way in dependence on the determined route and associated confidence value to allow the vehicle 10 to travel a portion 18 of the determined route 16 in an electric only mode.

In examples, the amount of energy required to travel the portion 18 of the determined route 16 in an electric only mode can be determined and/or estimated and the energy storage means 22 of the vehicle 10 controlled as the vehicle 10 travels along the route 16 to ensure that sufficient energy is present in the energy storage means 22 to allow the vehicle 10 to travel the portion 18 of the determined route 16 in an electric only mode. In examples, controlling an energy storage means 22 of the vehicle 10 can be considered and/or can comprise controlling a state of charge of an energy storage means 22 of the vehicle 10.

Accordingly, in examples, block 308 can be considered to comprise outputting a signal 20 to control a state of charge of an energy storage means 22 of the vehicle 10 in dependence on the determined route 16 and associated confidence value, such that the vehicle 10 may travel a portion 18 of the determined route 16 in an electric only mode. In some examples, controlling the energy storage means 22 comprises controlling the energy storage means 22 to allow the vehicle 10 to travel at least one predetermined portion 18 of the route 16 in an electric-only mode. In examples, block 308 can comprise outputting a plurality of signals to control the energy storage means 22 of the vehicle. In examples, block 308 can be considered outputting a signal 20 to activate control of an energy storage means 22 of the vehicle 10 in dependence on the determined route 16 and associated confidence value 14, such that the vehicle 10 may travel a portion 18 of the determined route 16 in an electric only mode. Accordingly, in examples, block 308 can be considered to comprise controlling activation of control of the energy storage means 22 of the vehicle 10. In examples, the energy storage means 22 can comprise any suitable energy storage means 22 to power one or more electric traction motors of the vehicle 10 to propel the vehicle 10. In examples, the energy storage means 22 can be considered: one or more components configured to store energy, energy storage circuitry, energy storage apparatus, energy storage mechanisms and so on. In examples, the energy storage means comprises or is one or more traction batteries which may be one or more high voltage batteries.

In examples, an electric only mode of the vehicle 10 can be considered a mode in which the vehicle 10 is propelled using electric energy only and without use of one or more internal combustion engines to propel the vehicle 10. In examples, the portion 18 of the determined route 16 can comprise any suitable portion 18 of the determined route 16. For example, the portion 18 of the route 16 can be at any suitable point or points along the route 16. In examples, the portion 18 of the route 16 may correspond to a portion 18 of the route 16 that passes through a low/controlled emission zone. In examples, the portion 18 of the route 16 may correspond to a geofenced portion 18 of the route 16. In examples, outputting a signal 20 to control the energy storage means 22 of the vehicle 10 in dependence on the determined route 16 and associated confidence value comprises determining if the associated confidence value is greater than a limit and determining if the ratio between a distance the vehicle 10 has travelled along the route 16 and a distance to the predicted destination 26 is greater than the limit.

In some examples, the method 300 comprises determining whether to output the signal 20 to control the energy storage means 22 of the vehicle 10 in dependence on the determined route 16 and associated confidence value. In some examples, the method 300 comprises determining whether to activate controlling of the state of charge of the energy storage means 22 of the vehicle 10 in dependence on the determined route 16 and associated confidence value. In some examples, determining whether to output the signal 20 comprises determining if the associated confidence value is greater than a limit and determining if the ratio between a distance the vehicle has travelled along the route 16 and a distance the predicted destination 12 is greater than a limit. In examples, any suitable limit for the associated confidence value can be used. For example, a limit in the range 70% to 90% can be used. In examples, a limit in the range 75% to 85% can be used. For example, a limit of 80% can be used and so on.

In examples, any suitable limit for the ratio between a distance the vehicle 10 has travelled along the route 16 and a distance of the predicted destination can be used. For example, it can be determined if vehicle 10 has followed at least 10% of the determined route 16 without rerouting. In examples, a limit in the range 5% to 15% can be used. In examples, a limit in the range 7.5% to 12.5% can be used. In examples, a limit of 10% of the route can be used. Accordingly, in examples, output of a signal 20 to control the energy storage means 22 of the vehicle 10 such that the vehicle 10 may travel a portion 18 of the determined route 16 in an electric only mode can be performed if the associated confidence value is greater than a limit and the ratio between a distance travelled along the route without rerouting and the distance to the predicted destination 12 is greater than a limit.

In examples, the vehicle 10 comprises energy management modes that can be used to control the energy storage means 22 of the vehicle 10. In some examples, controlling the energy storage means 22 comprises selecting an energy management mode for at least a portion 18 of the route 16. In examples, the energy management mode is a charging mode or a harvesting mode. In a charging mode the energy storage means 22 of the vehicle 10 is charged, for example, with an engine of the vehicle 10. In harvesting mode, energy is stored by, for example, inhibiting use of one or more electric motors of the vehicle 10 for providing positive torque. In some examples, controlling the energy storage means 22 comprises controlling at least one of: an electrical energy usage of the vehicle 10; an electrical energy storage of the vehicle 10; and an electrical energy generation of the vehicle 10.

For example, controlling the energy storage means 22 can comprise controlling use of electric motor(s) of the vehicle 10; controlling use of energy regeneration system(s) of the vehicle 10 and/or controlling state of charge limits of energy storage means 22 of the vehicle 10. In examples, method 300 comprises redetermining the predicted destination 12 and associated confidence value while the vehicle 10 is travelling. In some examples, method 300 comprises redetermining the predicted destination 12 and the associated confidence value while the vehicle 10 is travelling from its starting location to a different location. For example, the predicted destination 12 and associated confidence values can be redetermined at intervals to allow the predicted destination 12 to be changed as needed and/or to allow control of the energy storage means 22 of the vehicle 10 to be altered as needed. In examples, control of the energy storage means 22 can be applied for redetermined predicted destinations 12 and/or associated confidence values as described herein, for example with regard to block 308. For example, it can be determined that the vehicle is not following a determined route 16 and therefore the predicted destination 12 can be changed to a different possible destination 26 based on the route the vehicle 10 has actually travelled and/or the present location 24 of the vehicle 10. Similarly, the associated confidence value can be reassessed in dependence on changing information as the vehicle 10 travels.

Method 300 is advantageous and provides one or more technical benefits. For example, method 300 provides control of an energy storage means 22 of a vehicle 10 to be provided without requiring a user to input any information such as a destination. Method 300 also provides for predetermined portions along a determined route, such as low emission zones, to be travelled in an electric only mode automatically without requiring any input or effort from the user.

Figure 4A:
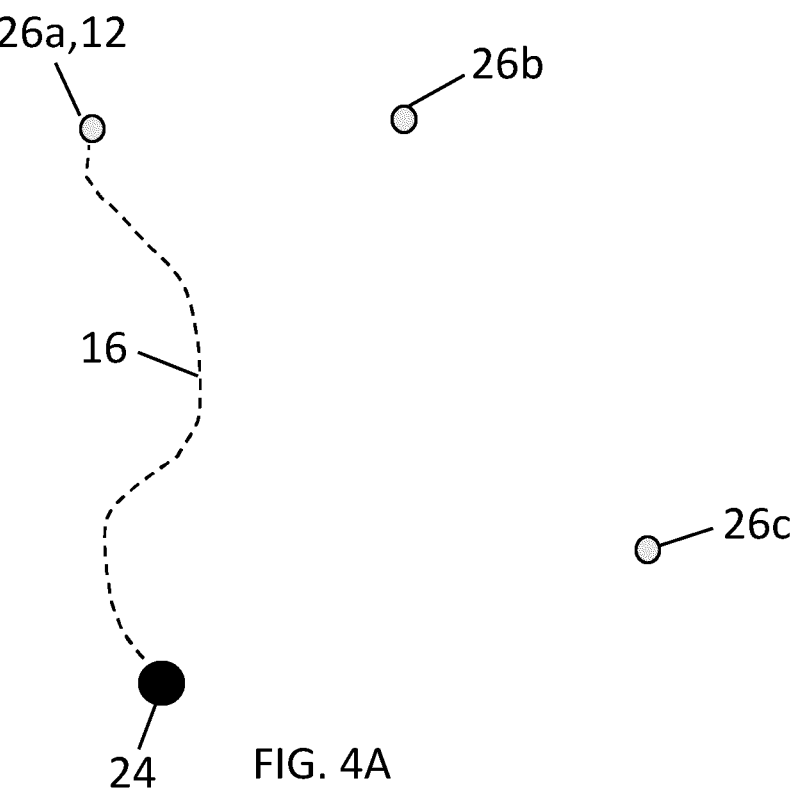
FIGS. 4A, 4B illustrate an example scenario.
Figure 4B:
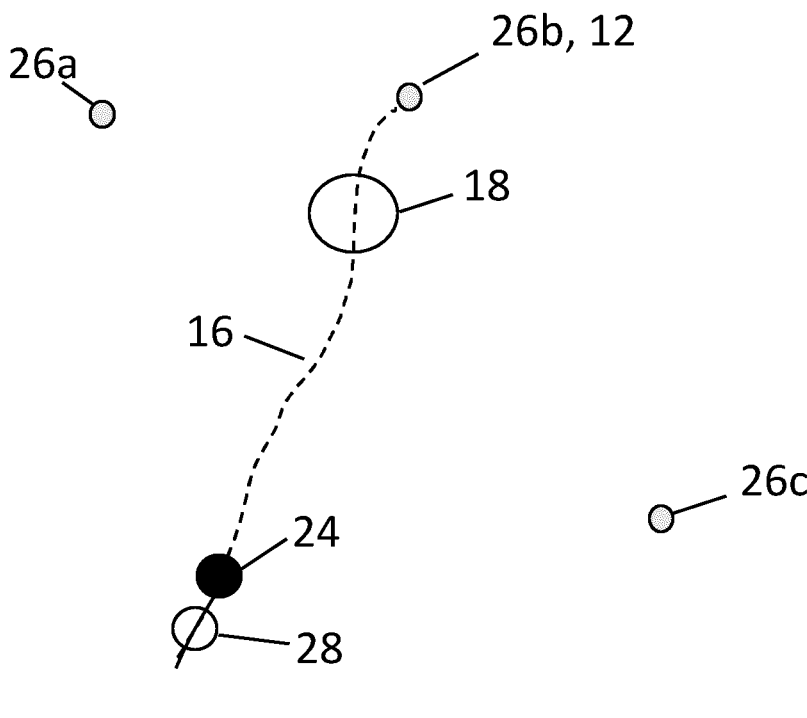

FIGS. 4A and 4B illustrate an example scenario. In the example of FIG. 4A a present location 24 of a vehicle 10 (not illustrated in the example of FIGS. 4A and 4B) is shown and three possible destinations 26a, b and c also indicated. In the example of FIGS. 4A and 4B three possible destinations 26 are indicated, however any suitable number of possible destinations can be used. On the basis of the present time of day, day of week and the present location 24 of the vehicle 10 it is determined that possible destination 26a is the predicted destination 12. In the example of FIG. 4A, possible destination 26a is determined as the predicted destination 12 because present location 24 of the vehicle 10 is the user's home location and on Monday morning at 8 am the user usually travels to possible destination 26a which is the user's work location. This means, in the example of FIG. 4A, possible destination 26a has the highest associated confidence value of 50%. In the illustrated example, a route 16 is determined to the predicted destination 12 (26a) and is represented by the dotted line.

FIG. 4B illustrates the example sometime later. In the example of FIG. 4B, an updated present location 24 of the vehicle 10 is illustrated along with a prior location 28 of the vehicle 10. It can be seen in the example of FIG. 4B that the vehicle 10 has not travelled along the expected route 16 shown in FIG. 4A towards the possible destination 26a. This is because, in the example of FIG. 4B, the user is driving towards possible destination 26b which is a local supermarket. Accordingly, in the illustrated example, the signal 20 to control the energy storage means 22 of the vehicle 10 is not output in the situation shown in FIG. 4A as the associated confidence value is not sufficient and the vehicle 10 had not traversed enough of the route 16. In the example of FIG. 4B, when the vehicle 10 was at location 28 the predicted destination 12 was redetermined as possible destination 26*b* and the route 16 to the possible destination 26*b* determined. In the example of FIG. 4B the present location of the vehicle 24 is further along the route 16 to the predicted destination 12 (26*b*).

At this point, the associated confidence value with the predicted destination 12 is 80% and the vehicle 10 has travelled along more than 10% of the route 16 (the example of FIGS. 4A and 4B are not to scale). Therefore, in the example of FIG. 4B, the signal 20 is output to control the energy storage means 22 of the vehicle 10 such that the vehicle 10 may travel the portion 18 of the determined route 16 in an electric only mode. In the example of FIG. 4B, the portion of the route 18 is indicated by a circle and corresponds to a low emissions zone along the route 16. Although a single portion 18 of the route 16 is considered in the example of FIG. 4B, in examples, any suitable number of portions 18 of the route 16 can be used/considered. Accordingly, it can be seen from the example of FIGS. 4A and 4B, that a user/driver of the vehicle 10 is not required to make any input and the vehicle 10 can automatically determine, and update, a predicted destination 12 and control an energy storage means 22 of the vehicle 10 accordingly.

Figure 5:
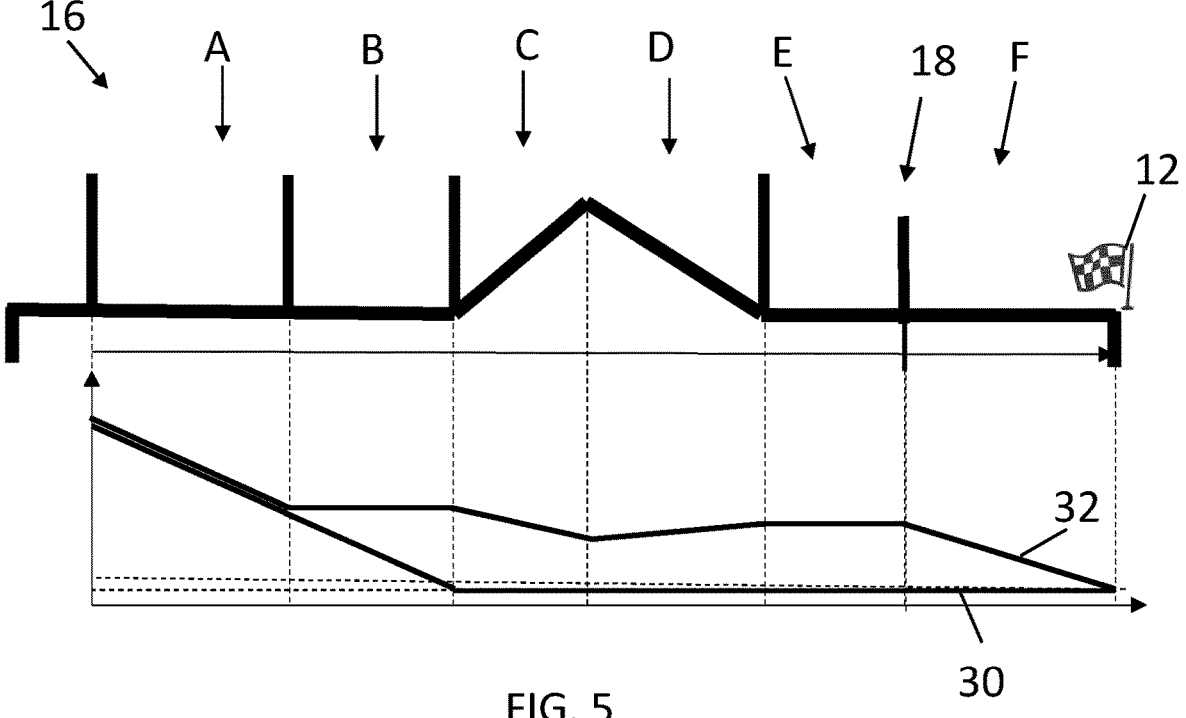
FIG. 5 illustrates an example scenario.

FIG. 5 illustrates an example of controlling an energy storage means 22 of a vehicle 10. The upper section of FIG. 5 schematically illustrates a route 16 to a predicted destination 12, with the end portion 18 of the route 16 being to the right of the figure. The example of FIG. 5 is not shown to scale. In the example of FIG. 5, the end portion of the route 16 is the portion 18 of the route 16 to be travelled in an electric-only mode and represents a low emission zone. In the example of FIG. 5, an EV speed limit of 70 kph is used. The gradient profile of the route 16 is schematically illustrated.

The lower portion of FIG. 5 illustrates a plot of state of charge of energy storage means 22 of the vehicle 10 on the y axis and route distance along the x axis. The line 30 on the plot illustrates the state of charge of the energy storage means 22 without control of the energy storage means 22 to allow the vehicle 10 to travel the end portion 18 of the route 16 in an electric-only mode. The line 32 illustrates the state of charge of the energy storage means 22 with control of the energy storage means 22 to all the vehicle 10 to travel the end portion 18 of the route 16 in an electric-only mode. In the example of FIG. 5, the route 16 has been segmented into six different portions or segments labelled A to F. The end portion 18 of the route 16 is portion F and is, in this example, the final 2 km of the route 16. As can be seen by the line 30, at the start of the journey the state of charge of the energy storage means 22 is high and the vehicle 10 proceeds in electric-only mode depleting the state of charge of the energy storage means 22. Without control of the state of charge, the state of charge of the energy storage means 22 continues to deplete until the charge sustain limit, illustrated by a dashed line, is hit at which point the state of charge of the vehicle 10 is maintained at the charge sustain limit. In this case, it is not possible for the end portion of the route 18 to be travelled in an electric-only mode.

Now considering the line 32 illustrating the state of charge of the energy storage means 22 when control is performed. In section A the vehicle 10 also travels in electric-only mode depleting the state of charge of the energy storage means 22. However, in section B the state of charge of the energy storage means 2 is held, for example, through use of an engine of the vehicle 10. In section C the vehicle must travel up an incline and some energy from the energy storage means 22 is used to assist in doing so reducing the state of charge. However, in section D the vehicle 10 travels down an incline allowing energy regeneration to increase the state of charge of the vehicle 10. In section E the state of charge of the vehicle is again held which ensures that there is sufficient state of charge in the energy storage means 22 of the vehicle 10 to allow the vehicle 10 to travel the end portion 18 (section F) of the route 16 in electric only mode. Examples of the disclosure are advantageous and provide technical benefits.

For example, examples of the disclosure provide for automatic activation and control of an energy storage means of a vehicle, while preventing premature activation of such control. Examples of the disclosure also provide for benefits in fuel economy as energy storage means of the vehicle can be automatically efficiently and effectively controlled to allow prioritisation of EV driving in low speed sections of a route where the EV drive is more efficient.

As used herein "for" should be considered to also include "configured or arranged to". For example, "a control system for" should be considered to also include "a control system configured or arranged to".

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application. The blocks illustrated in the FIG. 3 may represent steps in a method and/or sections of code in the computer program 206. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not. Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a hybrid-electric vehicle, the control system comprising one or more controllers, wherein the control system is configured to:

determine a predicted destination for the hybrid-electric vehicle;

determine an associated confidence value in dependence on the predicted destination;

determine a route to be travelled by the hybrid-electric vehicle in dependence on the predicted destination; and output a signal to control an energy storage means of the hybrid-electric vehicle in dependence on the determined route and associated confidence value, such that the energy storage means has sufficient electrical energy to propel the hybrid-electric vehicle over a predetermined portion of the determined route in an electric-only mode, wherein outputting the signal to control the energy storage means of the hybrid-electric vehicle in dependence on the determined route and associated confidence value comprises outputting the signal to control the energy storage means of the hybrid-electric vehicle responsive to the associated confidence value being greater than a first limit and a ratio between a distance the hybrid-electric vehicle has travelled along the route and a distance to the predicted destination being greater than a second limit.

2. The control system of claim 1, wherein the associated confidence value is determined in dependence on at least one of: time of day, day of week, week of month, month of year, a present location of the hybrid-electric vehicle, a number of times the hybrid-electric vehicle has stopped at the present location of the hybrid-electric vehicle, a number of times the hybrid-electric vehicle has travelled to a possible destination, a number of times the hybrid-electric vehicle has travelled from the present location of the hybrid-electric vehicle to the possible destination, and one or more occupants of the hybrid-electric vehicle.

3. The control system of claim 1, wherein the control system is configured to redetermine the predicted destination and the associated confidence value while the hybrid-electric vehicle is travelling.

4. The control system of claim 1, wherein controlling the energy storage means comprises selecting an energy management mode for at least a portion of the route.

5. The control system of claim 4, wherein the energy management mode is a charging mode or a harvesting mode.

6. The control system of claim 1, wherein controlling the energy storage means comprises controlling at least one of:

an electrical energy usage of the hybrid-electric vehicle;

an electrical energy storage of the hybrid-electric vehicle; and an electrical energy generation of the hybrid-electric vehicle.

7. The control system of claim 1, wherein the predetermined portion of the route is a low emission zone.

8. A vehicle comprising the control system as claimed in claim 1 and at least one energy storage means.

9. A method for a hybrid-electric vehicle, comprising:

determining a predicted destination for the hybrid-electric vehicle;

determining an associated confidence value in dependence on the predicted destination;

determining a route to be travelled by the hybrid-electric vehicle in dependence on the predicted destination; and outputting a signal to control an energy storage means of the hybrid-electric vehicle in dependence on the determined route and associated confidence value, such that the energy storage means has sufficient electrical energy to propel the hybrid-electric vehicle over a predetermined portion of the determined route in an electric-only mode;

wherein outputting the signal to control the energy storage means of the hybrid-electric vehicle in dependence on the determined route and associated confidence value comprises outputting the signal to control the energy storage means of the hybrid-electric vehicle responsive to the associated confidence value being greater than a first limit and a ratio between a distance the hybrid-electric vehicle has travelled along the route and a distance to the predicted destination being greater than a second limit.

10. The method of claim 9, wherein the associated confidence value is determined in dependence on at least one of: time of day, day of week, week of month, month of year, a present location of the hybrid-electric vehicle, a number of times the hybrid-electric vehicle has stopped at the present location of the hybrid-electric vehicle, a number of times the hybrid-electric vehicle has travelled to a possible destination, a number of times the hybrid-electric vehicle has travelled from the present location of the hybrid-electric vehicle to the possible destination, and one or more occupants of the hybrid-electric vehicle.

11. The method of claim 9, comprising redetermining the predicted destination and the associated confidence value while the hybrid-electric vehicle is travelling.

12. The method of claim 9, wherein controlling the energy storage means comprises selecting an energy management mode for at least a portion of the route.

13. A non-transitory computer readable medium comprising computer readable instructions that, when executed by a processor, causes the processor to perform the method according to claim 9.

* * * * *